United States Patent Office 3,340,299
Patented Sept. 5, 1967

3,340,299
TETRASUBSTITUTED ETHYLENE DIAMINES
Lester Weintraub, Bronx, and Ross C. Terrell, New York, N.Y., assignors to Air Reduction Company, Incorporated, New York, N.Y., a corporation of New York
No Drawing. Filed Mar. 27, 1964, Ser. No. 355,437
7 Claims. (Cl. 260—563)

This invention is concerned with N,N,N',N'-tetrasubstituted diamines, and is more particularly concerned with a novel method of preparing these compounds.

Tetrasubstituted diamines of the character indicated have been heretofore prepared by various methods. A typical method is disclosed, for example, in Reynolds et al. U.S. Patent 2,716,134, of Aug. 23, 1955, and other methods are referred to in the specification of that patent. These prior art processes do not always provide satisfactory yields of the desired tetrasubstituted diamines, or they generally involve unusual and sometimes relatively expensive reactants.

It is accordingly an object of the present invention to provide a novel process of producing N,N,N',N'-tetrasubstituted diamines which provides the desired products in good yields and utilizes readily available and relatively inexpensive reactants.

In accordance with the invention, tetrasubstituted diamines having the general formula

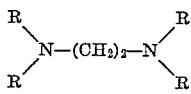

wherein each R can be the same or different members selected from the group consisting of an alkyl radical containing from 1 to 8 carbon atoms, i.e. lower alkyl, a yl, tolyl, xylyl and the like, or an aralkyl group, e.g. cyclopentyl or cyclohexyl groups, an aryl group, e.g. phenyl, toyly, xylyl and the like, or an aralkyl group, e.g. benzyl, phenylethyl, and the like, are prepared by reacting a secondary amine having the general formula

wherein each R has the meaning given above, with a halogenated ethyl alkyl carbonate or a halogenated ethyl ester of a carboxylic acid, preferably a lower-alkyl carboxylic acid, the carbonate and the ethyl ester containing at least 1 halogen atom, the halogen preferably being chlorine. As pointed out in the Reynolds et al. patent, the tetrasubstituted diamines of the above formula have various well-known uses, such as intermediates in the preparation of quarternized polymeric sulfonates, which are applicable as mordants in certain photograph color processes.

In accordance with the process of this invention, the secondary amine and the halogenated ethyl alkyl carbonate or the halogenated ethyl ester are heated together for a sufficient time to cause the reaction to go substantially to completion. The temperature of the reaction can vary, but a temperature of at least about 150° C. is employed, and it is generally not necessary to raise the temperature above about 250° C. Where the reactants, or the solvent when used, having boiling points below the temperature of reaction, the reaction is, of course, carried out in a closed vessel under pressure so that vaporization is suppressed.

After the reaction is completed, any excess amine is distilled off and there is added to the reaction mixture an excess of an aqueous alkali metal hydroxide, e.g. sodium, potassium or lithium hydroxide. If an oil layer forms, it is separated from the aqueous layer, and the product tetrasubstituted diamine is recovered by fractional distillation of the oil layer.

Advantageously the water layer can be extracted with a water-insoluble solvent such as benzene, diethyl ether, or the like, and the oil layer and the extract are combined and dried over a dehydrating agent, such as anhydrous magnesium sulfate or the like, and then fractionally distilled. In most cases, however, the product tetrasubstituted diamine precipitates from the alkali-treated mixture and is readily separated by filtration. Purification is suitably effected by recrystallization, e.g. from a 1:1 acetone-chloroform mixture.

For best results, the reactants should be thoroughly dried and reacted under strictly anhydrous conditions. The reaction can be carried out in an inert solvent, such as dry benzene, 1,4-dioxane, toluene or xylene but this is generally not necessary and the reactants can usually be directly reacted. The amount of the secondary amine employed in the reaction can vary widely, e.g. from 3 to 25 mole weights of the amine to each mole weight of the ethyl alkyl carbonate or the ethyl ester, but generally 3 to 8 mole weights of the amine are employed for each mole weight of the halogenated carbonate or ethyl ester. The excess of the amine can be recovered and used in succeeding runs, or recycled if the process is carried out in continuous operation.

The alkali employed to neutralize the reaction mixture, after the reaction has been completed, can be varied from just enough alkali to neutralize all of the acid groups released in the reaction and to free the tetrasubstituted amine from its salts, to a substantial excess, e.g. a 100% excess. Advantageously, an aqueous solution of the alkali is employed. Where an inert solvent is employed as the reaction medium, the concentration of reactants can vary within any practical limits, although concentrations of 50% and up are generally most suitable.

Suitable halogenated ethyl esters and halogenated ethyl alkyl carbonates, e.g. ethyl lower-alkyl carbonates, which can be employed in carrying out the process of this invention include bis(2-chloroethyl)carbonate, 2-chloroethyl ethyl carbonate, 2-chloroethyl methyl carbonate, 2-chloroethyl acetate, 2-bromoethyl acetate, 2-chloroethyl benzoate, 2-chloroethyl propionate, 2-chloroethyl butyrate, 2-bromoethyl benzoate, 2-chloroethyl butyl carbonate, and the like.

Suitable secondary amines which can be employed in the practice of this invention are dialkylamines such as dimethylamine, diethylamine, diisopropylamine, di-n-propylamine, di-n-butylamine, diisobutylamine, dihexylamine, bis-(2-ethylhexyl)-amine, and the like, mixed dialkylamines such as methylethylamine, methyl propylamine, methylisopropylamine, methyl n-butylamine, ethyl propylamine, ethyl n-butylamine, and the like, diarylamines such as diphenylamine, di-p-tolylamine, and the like, diaralkylamines such as dibenzylamine, ethylphenylamine, and the like, and dicycloalkylamines such as dicyclopentylamine, dicyclohexylamine, and the like.

The objects and features of the invention will be more readily apparent from the following specific examples of practical application.

EXAMPLE 1

*N,N,N',N'-tetracyclohexyl ethylene diamine*

Into an agitated reaction vessel there were charged 217 g. (1.2 moles) of dicyclohexylamine and 37.4 g. (0.2 mole) of bis-(2-chloroethyl) carbonate, and the mixture was heated at 175° C. for 20 hours with stirring. The mixture was then neutralized with 20% aqueous sodium hydroxide, cooled and filtered. The precipitate was recrystallized from an acetone-chloroform mixture to give white needles melting at 104–105° C. and having the following analysis.

Calculated for $C_{26}H_{48}N_2$: C, 80.41%; H, 12.37%; N, 7.21%. Found: C, 80.25%; H, 12.45%; N, 7.34%.

To further substantiate the nature of the product, a sample of N,N,N′,N′-tetracyclohexyl ethylene diamine was prepared according to the procedure of Reynolds et al. U.S. Patent 2,716,134, wherein ethylene glycol disulfonate and dicyclohexylamine were reacted. The infrared spectrum of this sample was identical to that of the product produced in the foregoing example, and a mixed melting point showed no depression.

EXAMPLE 2

The procedure described in Example 1 was repeated using 0.9 mole of dicyclohexyl amine and 0.3 mole of 2-chloroethyl ethyl carbonate. The product obtained was identical with the product produced in Example 1.

EXAMPLE 3

N,N,N′,N′-tetracyclohexyl ethylene diamine was prepared by reacting a 3 to 1 mole ratio of dicyclohexyl amine and 2-chloroethyl acetate at 180–230° for 20 hours. The product was worked up as described in Example 1.

EXAMPLE 4

*N,N,N′,N′-tetraisobutyl ethylene diamine*

A 3 to 1 mole ratio of diisobutylamine to 2-chloroethyl ethyl carbonate was reacted in a 1-liter stainless steel autoclave at 190° for 20 hours. After reaction, the mixture was worked up as described in Example 1 for N,N, N′,N′-tetracyclohexyl ethylene diamine. By fractional distillation, N,N,N′,N′-tetraisobutyl ethylene diamine was obtained, B.P. 114–115° C. at 1.5 mm.

Calculated for $C_{18}H_{40}N_2$: C, 76.05%; H, 14.09%; N, 9.85%. Found: C, 76.30%; H, 14.55%; N, 10.46%.

EXAMPLE 5

*N,N,N′,N′-tetra(2-ethyl hexyl) ethylene diamine*

In an agitated autoclave, 32 g. (0.16 mole) of bis-(2-chloroethyl) carbonate and 241 g. (1 mole) of bis-(2-ethylhexyl) amine were reacted at 180° C. for 25 hours with stirring. After reaction, the red solution was made basic with 40% aqueous sodium hydroxide. After filtering from the precipitated sodium chloride, the amine layer was separated from the aqueous layer and washed with water. The aqueous layer was extracted with ether and combined with the amine layer and dried over anhydrous magnesium sulfate. After filtering, the solution was fractionally distilled to give a product distilling at 211–212° C. at 2 mm. pressure.

Calculated for $C_{34}H_{72}N_2$: C, 80.31%; H, 14.17%; N, 5.51%. Found: C, 79.90%; H, 13.97%; N, 5.69%.

In all of the foregoing examples the reactions were characterized by the fact that the reactants interacted to form substantially only the desired tetrasubstituted ethylene diamine with little if any conversion to by-products, thus making possible the production of the tetrasubstituted ethylene diamines in good yields.

It will be understood that various changes and modifications may be made in the foregoing description without parting from the scope of the invention, as defined in the appended claims and it is intended, therefore, that all matter contained in the foregoing description shall be interpreted as illustrative only and not as limitative of the invention.

We claim:
1. A method for producing tetrasubstituted diamines having the general formula

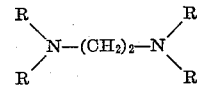

wherein R is selected from the group consisting of a lower alkyl radical, a cycloalkyl radical containing up to 6 carbon atoms, a monocyclic aryl radical and a monocyclic aralkyl radical which comprises reacting a secondary amine having the general formula

with a halogenated ester selected from the group consisting of a chloro or bromo ethyl, alkyl carbonate and a chloro or bromo ethyl ester of a monocarboxylic acid wherein the carboxyl group is attached to an alkyl or monocyclic aryl group.

2. A method for producing tetrasubstituted diamines as defined in claim 1, wherein the reaction is carried out at a temperature of at least 150° C.

3. A method for producing tetrasubstituted diamines as defined in claim 1, wherein said halogenated ester is bis-(2-chloroethyl) carbonate.

4. A method for producing tetrasubstituted diamines as defined in claim 1, wherein said halogenated ester is 2-chloroethyl acetate.

5. A method for producing tetrasubstituted diamines as defined in claim 1, wherein said diamine is N,N,N′,N′-tetracyclohexyl ethylene diamine, which comprises reacting dicyclohexylamine with a halogenated ester selected from the group consisting of a chloro or bromo ethyl, alkyl carbonate and a chloro or bromo ethyl ester of a monocarboxylic acid wherein the carboxyl group is attached to an alkyl or monocyclic aryl group.

6. A method for producing tetrasubstituted diamines as defined in claim 1, wherein said diamine is N,N,N′,N′-tetraisobutyl ethylene diamine, which comprises reacting diisobutylamine with a halogenated ester selected from the group consisting of a chloro or bromo ethyl, alkyl carbonate and a chloro or bromo ethyl ester of a monocarboxylic acid wherein the carboxyl group is attached to an alkyl or monocyclic aryl group.

7. A method for producing tetrasubstituted diamines as defined in claim 1, wherein said diamine is N,N,N′,N′-tetra(2-ethylhexyl) ethylene diamine, which comprises reacting bis-(2-ethylhexyl) amine with a halogenated ester selected from the group consisting of a chloro or bromo ethyl, alkyl carbonate and a chloro or bromo ethyl ester of a monocarboxylic acid wherein the carboxyl group is attached to an alkyl or monocyclic aryl group.

No references cited.

CHARLES B. PARKER, *Primary Examiner.*

NELSON A. WICZER, *Assistant Examiner.*

UNITED STATES PATENT OFFICE
CERTIFICATE OF CORRECTION

Patent No. 3,340,299                          September 5, 1967

Lester Weintraub et al.

It is hereby certified that error appears in the above numbered patent requiring correction and that the said Letters Patent should read as corrected below.

Column 1, line 37, for "yl, tolyl, xylyl and the like, or an aralkyl group," read -- cycloalkyl group containing up to 6 carbon atoms, --; line 39, for "toyly" read -- tolyl --.

Signed and sealed this 29th day of April 1969.

(SEAL)
Attest:

Edward M. Fletcher, Jr.                       EDWARD J. BRENNER

Attesting Officer                            Commissioner of Patents